(12) United States Patent
Maksimovic et al.

(10) Patent No.: US 7,148,669 B2
(45) Date of Patent: Dec. 12, 2006

(54) PREDICTIVE DIGITAL CURRENT CONTROLLERS FOR SWITCHING POWER CONVERTERS

(75) Inventors: Dragan Maksimovic, Boulder, CO (US); Jingquan Chen, Sunnyvale, CA (US); Aleksandar Prodic, Toronto (CA); Robert W. Erickson, Boulder, CO (US)

(73) Assignee: The Regents of the University of Colorado, a body corporate, Boulder, CO (US)

( * ) Notice: Subject to any disclaimer, the term of this patent is extended or adjusted under 35 U.S.C. 154(b) by 285 days.

(21) Appl. No.: 10/770,018

(22) Filed: Feb. 2, 2004

(65) Prior Publication Data
US 2005/0168198 A1 Aug. 4, 2005

(51) Int. Cl.
*G05F 1/56* (2006.01)
(52) U.S. Cl. ........................ 323/283; 323/222
(58) Field of Classification Search .......... 323/222, 323/282, 283
See application file for complete search history.

(56) References Cited

U.S. PATENT DOCUMENTS 6,801,028 B1 * 10/2004 Kernahan et al. .......... 323/283

OTHER PUBLICATIONS

Bibian et al., "High Performance Predictive Dead-Beat Digital Controller for DC Power Supplies", IEEE, Feb. 2001, pp. 67-73.
Bibian et al., "Digital Control with Improved Performance for Boost Power Factor Correction Circuits", IEEE, Feb. 2001, pp. 137-143.

* cited by examiner

*Primary Examiner*—Jeffrey Sterrett
(74) *Attorney, Agent, or Firm*—Patton Boggs LLP (57) ABSTRACT

The present invention provides a method for producing a controlled output voltage for a switching power converter under current control using pulse width modulation, the switching power converter including a predictive digital current-mode controller and a digital pulse width modulator. The current control results in an unstable output voltage, and the pulse width modulation method is selected to eliminate the instability of the output voltage.

20 Claims, 10 Drawing Sheets

| | VALLEY | PEAK | AVERAGE |
|---|---|---|---|
| TRAILING | INHERENTLY STABLE | D > 0.5 | D > 0.5 |
| LEADING | D < 0.5 | INHERENTLY STABLE | D < 0.5 |
| TRAILING TRIANGLE | * STABLE | D > 0.5 | INHERENTLY STABLE |
| LEADING TRIANGLE | D < 0.5 | * STABLE | INHERENTLY STABLE |

* STABLE WITH RESTRICTIONS ON THE OPERATING RANGE

PREDICTIVE DIGITAL CURRENT CONTROLLERS FOR SWITCHING POWER CONVERTERS

BACKGROUND OF THE INVENTION

1. Field of the Invention

This invention relates in general to current controllers and in particular to a predictive digital current controller for switching power converters.

2. Statement of the Problem

Switching power converters exploit the energy storage characteristics of magnetic and capacitive circuit elements. Therefore, the switching regulator takes discrete packets of energy from an input power source, stores the energy in a magnetic field of an inductor or as an electric field in a capacitor, and then transfers the energy to the load. The switching power converter takes an input current (AC or DC) from a voltage (or current) source and produces a voltage (or current) at the output that is different from the input voltage (or current).

The most common control technique for transferring energy from the energy storage element to the load is pulse width modulation (PWM). The packets of energy removed from the input power source are varied in duration, within a fixed operating period, as necessary to maintain an average energy transfer. Switching power converters exhibit high efficiencies because the power-switching elements are ideally lossless: when a switch is on, the voltage across it is very close to zero; when a switch is off, the current through the switch is very close to zero; either way, the product of voltage and current (i.e., the instantaneous power) across the switch is close to zero and, therefore, the switch is almost a lossless component; yet it is capable of controlling the energy transfer from input to output One method of controlling the feedback loop and the regulation characteristics of a switching power converter is current control.

Figure 1:
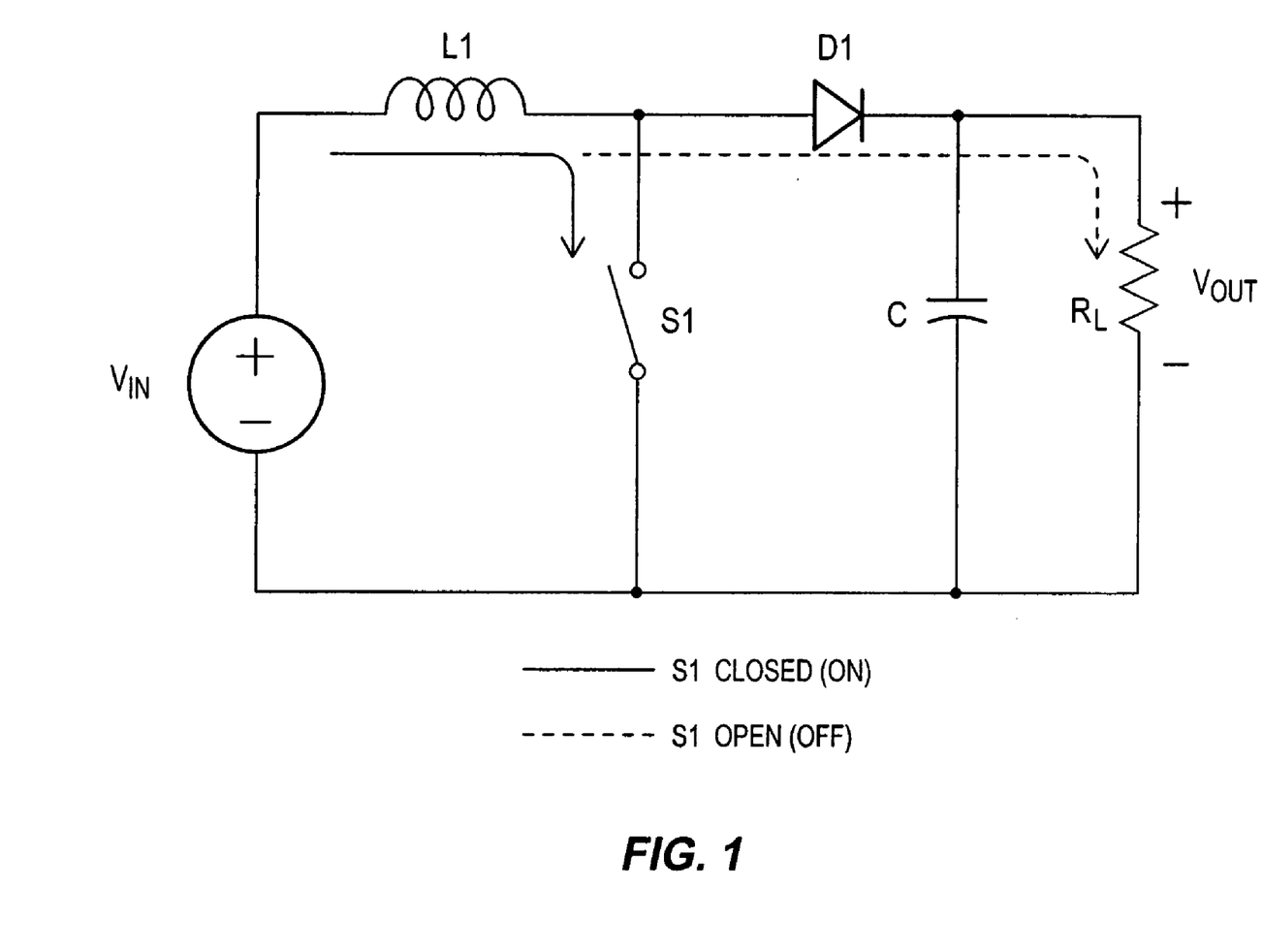
FIG. 1 is a schematic diagram of a boost converter of the prior art.

A simplified schematic diagram of a boost converter is shown in FIG. 1. In general, a switching power converter, such as the boost shown in FIG. 1, consists of switches such as S1 and D1 in FIG. 1 and energy-storage components such as L1 and C in FIG. 1. The converter operates by turning one or more of the switches on or off. The on/off states of the switches determine how the energy-storage components, the input, and the output are connected. The length of time the switches are in on or off positions is the control variable that affects the conversion properties of the switching power converter.

To construct a voltage regulator, a feedback loop is constructed around a converter: the output voltage is sensed and compared to a reference; the error between the sensed voltage and the reference is amplified by an error amplifier (also called compensator); and the output of the compensator is the command to a pulse-width modulator that generates a pulsating waveform (or waveforms) that control the on/off state of the switches. In steady state, the output voltage is forced to be equal to or very close to the reference, in spite of possible load variations, input voltage variations, or component tolerances.

Two most popular implementations of the generic feedback loop description above are (1) voltage-mode PWM control, where only the output voltage is sensed and the compensator in the controller operates solely based on the error between the sensed voltage and the reference; and (2) current-mode control, where, in addition to the output voltage sensing, a current from the converter circuit is also sensed, and the compensator operates based on both the sensed voltage error and the sensed current. Advantages of the current-mode control include improved and more robust control performance, built-in over-current protection, the ability to enable current-sharing in paralleled converter modules, and/or the ability to control the current waveshape in applications that require this feature (such as in AC-DC rectifiers with power factor correction (PFC)). Furthermore, there are several variations on the current-mode control technique of which peak current mode control and average current mode control are the most popular. State-of-the-art implementations of voltage-mode PWM and current-control mode are explained in detail in Erickson, R. W., Maksimovic, D. *Fundamental of Power Electronics*, $2^{nd}$ edition, Kluwer Academic Publishers, 2000.

Current programmed control finds wide applications in switching power converter applications. Current control can be classified as peak, valley, or average current control, depending on whether the maximum, the minimum, or an average point of the sensed inductor current is compared to the reference current. The fact that the inductor current is tightly controlled results in simpler converter dynamics, allowing simple and robust wide-bandwidth control. In addition, the peak current control offers fast over-current switch protection.

Given the fact that the switch (or the inductor) current is a fast-changing waveform, and that switching frequencies are in the range of hundreds of kilohertz (KHz) to megahertz (MHz), a direct implementation of the analog current programmed control in digital hardware is not easy. The need for a very fast analog-to-digital (A/D) converter to produce multiple samples of the sensed current per switching period, and the corresponding need for large signal processing capabilities, may require excessively complex hardware and complex algorithms. Sampling and processing result in a delay that can compromise control performance, especially in high-frequency applications. One way to improve the digital control performance is the predictive technique, which has been applied in three-phase systems. In one switching period, the duty cycle for the next switching cycle is calculated based on the sensed or observed state and input/output information, such that the error of the controlled variable is cancelled out or minimized in the next cycle or in the next several cycles. In particular, valley current control has been applied to DC-to-DC converters. It has been found that the "period-doubling" oscillation issues, which are notable in analog current programmed control, also exist in digital predictive current controllers.

Predictive techniques have found applications in single-phase rectifiers and DC-to-DC converters. However, the predictive technique has only been applied to the control of the inductor valley current using trailing-edge pulse width modulation. Valley current control using trailing-edge pulse width modulation has been described in S. Bibian and H. Jin, "High Performance Predictive Dead-Beat Digital Controller for DC Power Supplies", IEEE Applied Power Electronics Conference, 2001 Record, pp. 67–73; and S. Bibian and H. Jin, "Digital Control with Improved Performances for Boost Power Factor Correction Circuits", IEEE Applied Power Electronics Conference, 2001 Record, pp. 137–143.

In other applications, peak current control and average current control is preferred to valley current control. However, oscillations occur under operating conditions wherein the duty cycle is greater than 0.5 when trailing-edge pulse width modulation is used to predict a next duty cycle under peak current control and average current control. This is the same instability problem as in analog current control, where the instability is usually suppressed by adding a ramp signal to the sensed current signal. Under trailing-edge pulse width modulation, only predictive valley current control can be achieved for all operating conditions without oscillations.

For these reasons, a need exists for digital current programmed control technique that is effective for peak, average, and valley current control without complex hardware or complex algorithms.

SUMMARY OF THE INVENTION

The present invention advances the art and helps overcome the aforementioned problems by providing a method for matching the pulse width modulation with the current control objective such that the current control variable can be sampled at equally spaced intervals equal to the switching period.

The present invention provides a method for producing a controlled output voltage for a switching power converter under current control using pulse width modulation, the switching power converter including a predictive digital current-mode controller and a pulse width modulator by selecting a current control objective which typically results in an unstable output voltage and selecting a pulse width modulation method to compensate for the instability of the output voltage for the selected current control objective.

In a preferred embodiment of the invention, the current control objective resulting in an unstable output voltage is a peak current control, and the pulse width modulation method selected to overcome the instability is a leading-edge pulse width modulation. In another embodiment of the invention, the current control objective resulting in an unstable output voltage is an average current control and the pulse width modulation selected is a triangular pulse width modulation.

Operationally, a switching power converter reference current is sensed at the beginning of each next switching cycle and the predictive digital current-mode controller predicts a next duty cycle using the sensed reference current and a reference current to generate a control signal. The control signal is applied to the selected pulse width modulation method at the digital pulse width modulator to generate the pulsating control signal to produce the controlled output voltage for the switching power converter.

In another embodiment of the invention, the switching power converter includes a digital current-mode controller under one of a peak current control and average current control for predicting a next duty cycle of a pulsating control signal and a pulse width modulator and generating the control signal used at the pulse width modulator for producing the pulsating control signal by applying the control signal to the corresponding one of leading-edge pulse width modulation and the triangular pulse width modulation to eliminate the instability in the resulting output voltage.

In a preferred embodiment, current control is a peak current control, and the pulse width modulation is a leading-edge pulse width modulation to overcome the instability.

In another preferred embodiment, the current control is an average current control and the pulse width modulation is a triangular pulse width modulation to overcome the instability.

DETAILED DESCRIPTION

In this disclosure, "unstable" and "instability" refers to "period-doubling" oscillation issues which are notable in analog current programmed control, and also exist in digital predictive current controllers.

Figure 2:
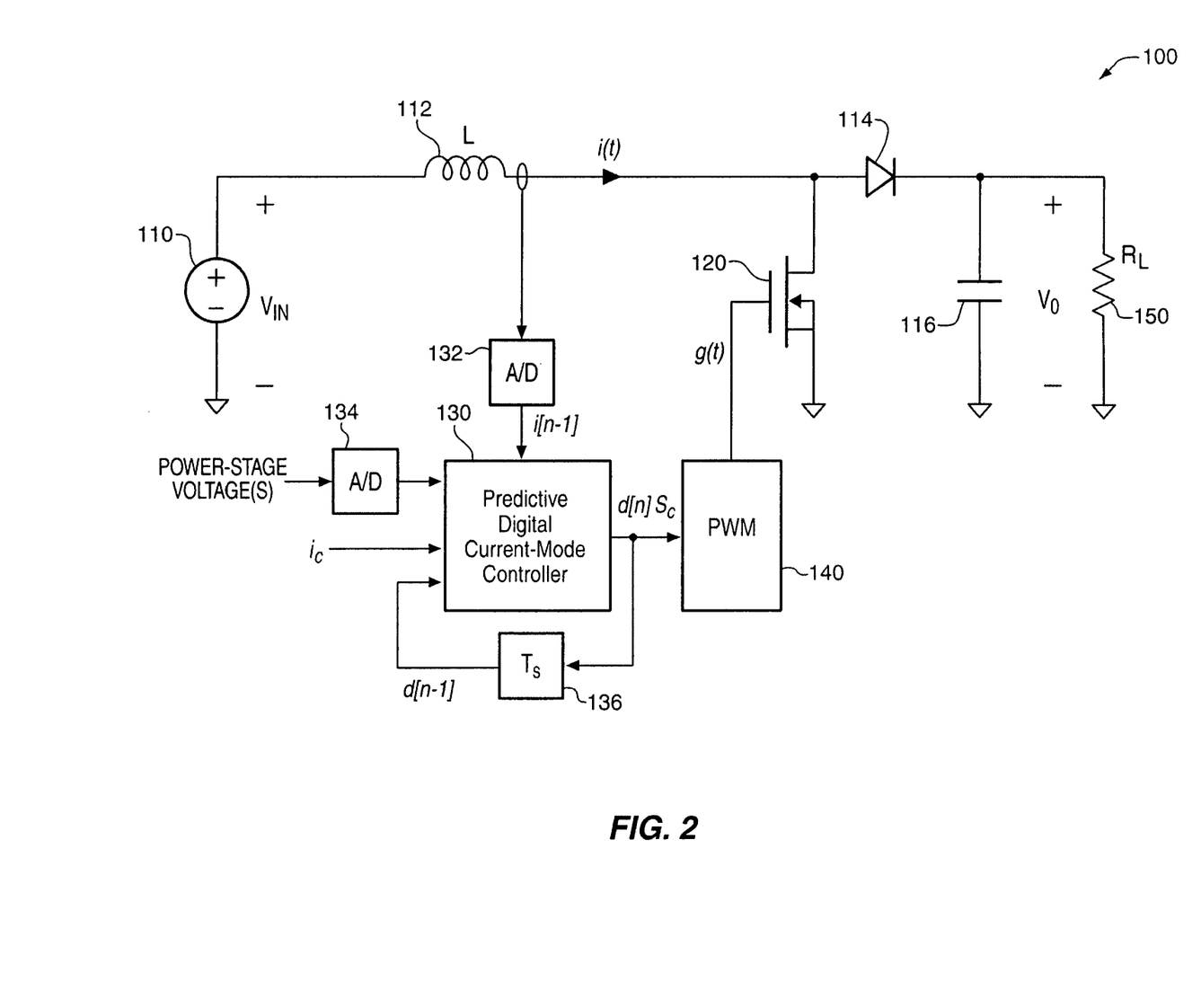
FIG. 2 illustrates a schematic diagram of a boost converter embodying the present predictive digital current controllers for switching power converters.

FIG. 2 is a schematic diagram of a boost switching power converter embodying the predictive digital current controller according to a preferred embodiment of the present invention. A typical boost switching power converter as illustrated in FIG. 2 comprises an input voltage source $V_{in}$ 110, an inductor 112, a diode 114, and load 150 serially connected, a switching transistor 120 (a MOSFET in this example) with the drain connected between inductor 112 and diode 114, and an output capacitor 116 across load 150. Load 150 in this example is illustrated as a resister, although the load could be an integrated circuit or any other type of load.

The boost switching power converter 100 further includes a predictive digital current-mode controller (PDCMC) 130 and a pulse width modulator 140 (DPWM). An analog-to-digital converter 132 converts a sampled analog inductor current i(t) to a digital value which is fed into the predictive digital current-mode controller 130. In an embodiment, an input and/or output voltage is converted to a digital value at analog-to-digital converter 134, which is also fed into predictive digital current-mode controller 130. The output d[n]

of predictive digital current-mode controller 130 is fed into register 136 which stores the previous value of the duty-cycle command d[n]. The previous value of the duty-cycle command, d[n−1], is fed into predictive digital current-mode controller 130 along with a predetermined reference current $i_c$. The output of predictive digital current-mode controller 130 is applied to digital pulse width modulator 140, and the pulsating control signal g(t) generated by pulse width modulator 140 is applied to the base of switching transistor 120 to control the flow of inductor current i(t).

The boost switching power converter may be operated following one of three predictive current programmed control modes: predictive valley current control, predictive peak current control, or predictive average current control. The current being controlled is the inductor current i(t). All three current control techniques are based on the same approach of using sampled inductor current i(t) to compute a predicted duty cycle for the next switching cycle so that the error between the reference current $i_c$ and the selected current control variable (the valley, peak, or average current) is reduced to zero. Switching transistor 120 controls the flow of the inductor current i(t) during each next switching cycle.

Figure 3:
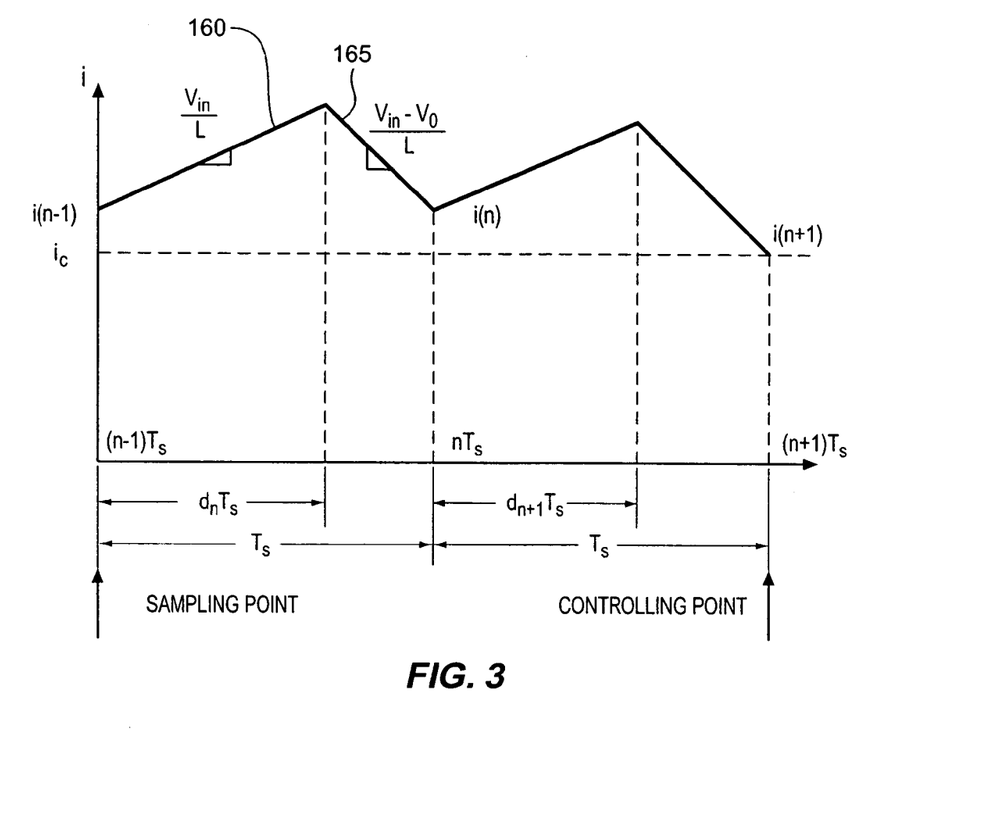
FIG. 3 is a graphical representation of an inductor current in the boost power-switching converter under valley current control of FIG. 2.

The inductor current i(t) is sampled at equally spaced intervals, referred to as switching cycles, and converted at analog-to-digital converter 132 to a digital value for use by predictive digital current-mode controller 130. Each switching cycle has a switching period $T_s$. Predictive digital current-mode controller 130 predicts a duty cycle for the next switching cycle based on the sampled inductor current i(n−1), a predetermined reference current $i_c$, and the previous duty cycle d[n−1]. For each switching cycle, the inductor current i(t) is controlled by the next duty cycle predicted by predictive digital current-mode controller 130 to generate the next control signal that is applied to pulse width modulator 140. FIG. 3 is a graphical representation of the inductor current i(t) for valley current control objective under trailing-edge pulse-width modulation. The graphical representation of FIG. 3 illustrates the slope 160 at which the inductor current i(t) increases when switching transistor 120 is on, and slope 165 at which the inductor current i(t) decreases when switching transistor 120 is switched off.

The pulsating switch control signal g(t) generated at pulse width modulator 140 switches switching transistor 120 on and off, which controls the inductor current i(t) during each next switching cycle. In a preferred embodiment, the selection of the pulse width modulation method is based on the current control objective of the predictive digital current-mode controller. In an exemplary embodiment, the pulse width modulation method is selected in accordance with the correlation between current control objectives and pulse width modulation method identified as "inherently stable" in the table of FIG. 4.

The next duty cycle control signal produced by the digital current-mode controller is a digital signal. However, the pulse width modulator may be digital or analog. When the pulse width modulator is analog, the digital output from the digital current-mode controller is converted by a digital-to-analog converter (not shown) to produce an analog control signal for use by the analog pulse width modulator.

Figure 5A:
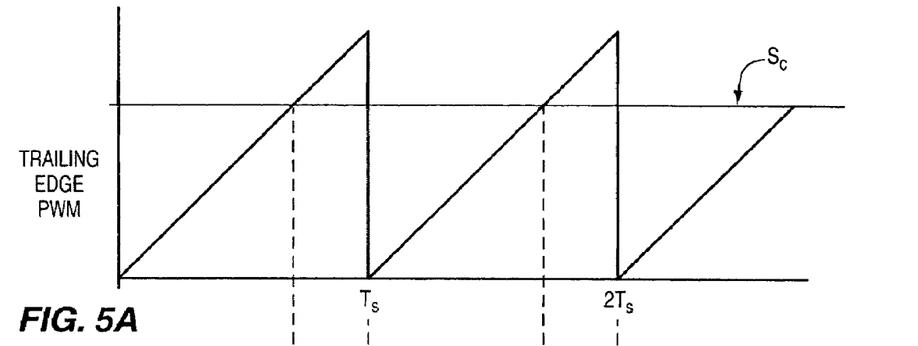
FIGS. 5a–5c illustrate a graphical representation of trailing-edge pulse width modulation waveform, a pulsating control signal, and a resultant inductor current under valley current control, respectively.
Figure 5B:
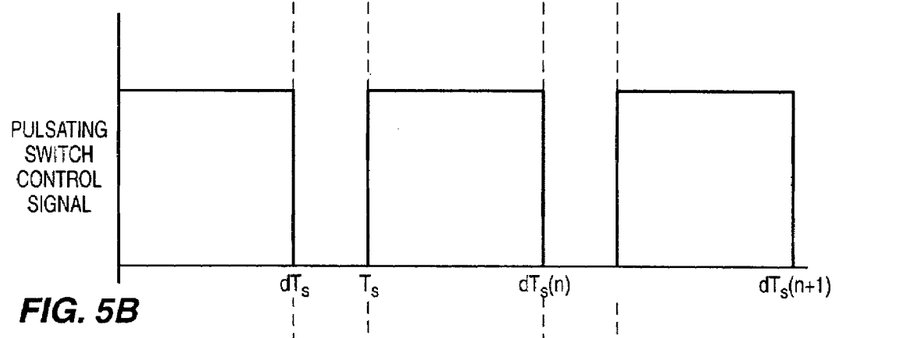

At pulse width modulator 140, the pulsating switch control signal g(t) is produced by comparing a next duty cycle control signal $S_c$ with the pulse width modulation waveform generated at pulse width modulator 140. Under predictive valley current control at predictive digital current-mode controller 130, the pulse width modulation method selected for pulse width modulator 140 is a trailing-edge saw-tooth waveform. FIG. 5a is a graphical representation of a trailing-edge saw-tooth waveform having a synchronized switching cycle $T_s$ and a voltage $V_{saw}(t)$. The next duty cycle control signal $S_c$ is compared to the trailing-edge saw-tooth waveform voltage $V_{saw}(t)$ to generate the pulsating switch control signal g(t). When the next duty cycle control signal $S_c$ is a greater value than the voltage level $V_{saw}(t)$ of the trailing-edge saw-tooth waveform, the pulsating switch control signal g(t) is high, as shown in the graphical representation of FIG. 5b. When the next duty cycle control signal $S_c$ is a lesser value than the voltage level $V_{saw}(t)$ of the trailing-edge saw-tooth waveform, the pulsating switch control signal g(t) is low. At the end of the first switching cycle $T_s$, the trailing-edge saw-tooth waveform repeats for a next switching cycle $2T_s$. The resultant pulsating switch control signal g(t) controls the operation of switching transistor 120.

Switching transistor 120 is turned on when the pulsating switch control signal g(t) is high and then stays off for the rest of the switching cycle $T_s$. When switching transistor 120 is on, diode 114 is biased off and the inductor current i(t) increases at a slope as energy is stored as illustrated in the graphical representation of FIG. 5c. The pulsating switch control signal g(t) transitions to a low at the end of the duty cycle $d_n T_s$, turning switching transistor 120 off. When switching transistor 120 is off, the inductor current i(t) decreases as the inductor current i(t) flows through the forward biased diode 114 to capacitor 116.

The duty cycle of switching transistor 120 is the ratio of the operating, or on, time to the total switching cycle $T_s$. The duty cycle d[n] for each next pulsating switch control signal is predicted by predictive digital current-mode controller 130, and a next duty cycle control signal is applied to the pulse width modulator 140 waveform. The previous duty cycle d[n−1] is fed back into predictive digital current-mode controller 130 for use in predicting a next duty cycle d[n]. At predictive digital current-mode controller 130, the sampled inductor current i(t), the previous duty cycle d[n−1], and possibly the input and/or output voltages, are used to compute the next duty cycle d[n] in the next switching cycle $2T_s$ so that the error between the reference current $i_c$ and the inductor current i(t) is reduced to zero.

Predictive Valley Current Control

In this section, the predictive valley current programmed control objective is discussed using the trailing-edge pulse width modulation method. Without loss of generality, it is assumed that the sample current $i_s[n]$ is obtained by sampling the inductor current i(t) at the beginning of the nth switching period.

Figure 5C:
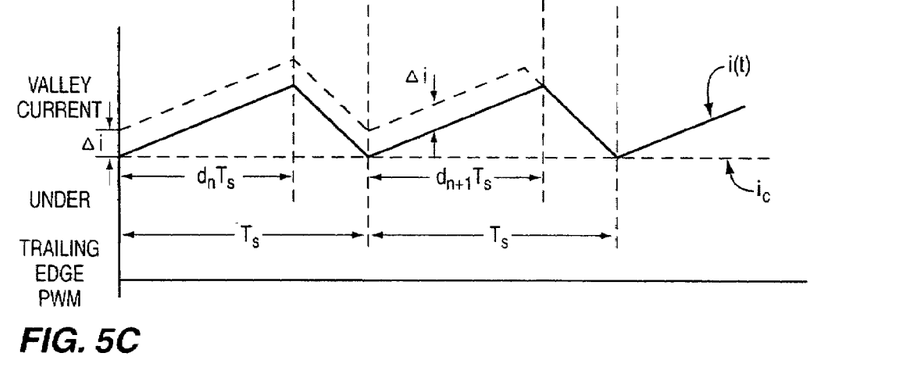

The goal of this current control method is to ensure that the valley inductor current follows the reference current $i_c$. The required duty cycle for the next switching cycle is predicted based on the sampled inductor current and possibly the input and the output voltages. The resulting inductor current waveform is shown in FIG. 5c. Since the input voltage and the output voltage are slowly varying signals, they can be considered constant during a switching period. The inductor current i(n) at the end of the nth switching cycle can be found as a function of the value at the beginning of this switching cycle i(n−1) and the applied duty cycle d[n], provided that the input voltage, the output voltage, the inductance, and the switching period are known:

$$i(n) = i(n-1) + \frac{v_{in} d[n] T_s}{L} + \frac{(v_{in} - v_o) d'[n] T_s}{L}. \quad (1)$$

By collecting terms, Equation (1) can be rewritten as:

$$i(n) = i(n-1) + \frac{v_{in}T_s}{L} - \frac{v_o d'[n]T_s}{L} \quad (2)$$

We can then extend Equation (2) for another switching cycle to obtain:

$$i(n+1) = i(n-1) + 2\frac{v_{in}T_s}{L} - \frac{v_o d'[n]T_s}{L} - \frac{v_o d'[n+1]T_s}{L} \quad (3)$$

The prediction for the duty cycle d[n+1] can now be obtained based on the values sampled in the previous switching period. Denoting the sampled current as $i_s[n]$, and substituting the control objective $i(n+1)=i_c$ in Equation (3), we have:

$$i_c = i_s[n] + 2\frac{v_{in}T_s}{L} - \frac{v_o d'[n]T_s}{L} - \frac{v_o d'[n+1]T_s}{L} \quad (4)$$

Equation (4) can be solved for the predicted duty cycle:

$$d[n+1] = 2 - d[n] - \frac{L}{v_o T_s}[i_s[n] - i_c] - 2\frac{v_{in}}{v_o} \quad (5)$$

Equation (5) gives the basic control law for the predictive current programmed control.

Stability properties of the predictive valley current control under trailing-edge modulation can be examined with reference to the waveform of FIG. 5c. The solid line shows the current waveform in steady state, while the dashed line shows the current with a perturbation at the beginning of the switching period n. Since the effects of the predicted duty cycle d[n+1] cannot be observed until the next switching period, this perturbation appears at the beginning of the $(n+1)^{th}$ cycle. With the next duty cycle d[n+1] computed according to the basic control law of Equation (5), the valley current reaches the reference current $i_c$ by the end of the (n+1)th switching period. The initially assumed perturbation disappears. As a result, for the predictive valley current control under trailing-edge pulse width modulation, the current controller is inherently stable for all operating points.

Under trailing-edge pulse width modulation, only predictive valley current control can be achieved without oscillations for all operating conditions. A distinction between the valley current control and the other two control objectives (peak or average current) is that, in trailing-edge modulation, the targeted control variable (the valley current) always can be sampled at the beginning of the switching period, i.e., at equally spaced intervals equal to the switching period $T_s$. This is not the case for peak or average current control. For example, under pulse width modulation, the peak current occurs at $d[n]T_s$, i.e., at variable time instants during a switching period. As a result, even though the controller may achieve the objective of forcing the peak current to follow the reference, a perturbation in the current waveform can grow in time, causing undesirable oscillations.

Predictive Peak Current Control

Trailing-Edge Pulse Width Modulation

Figure 6:
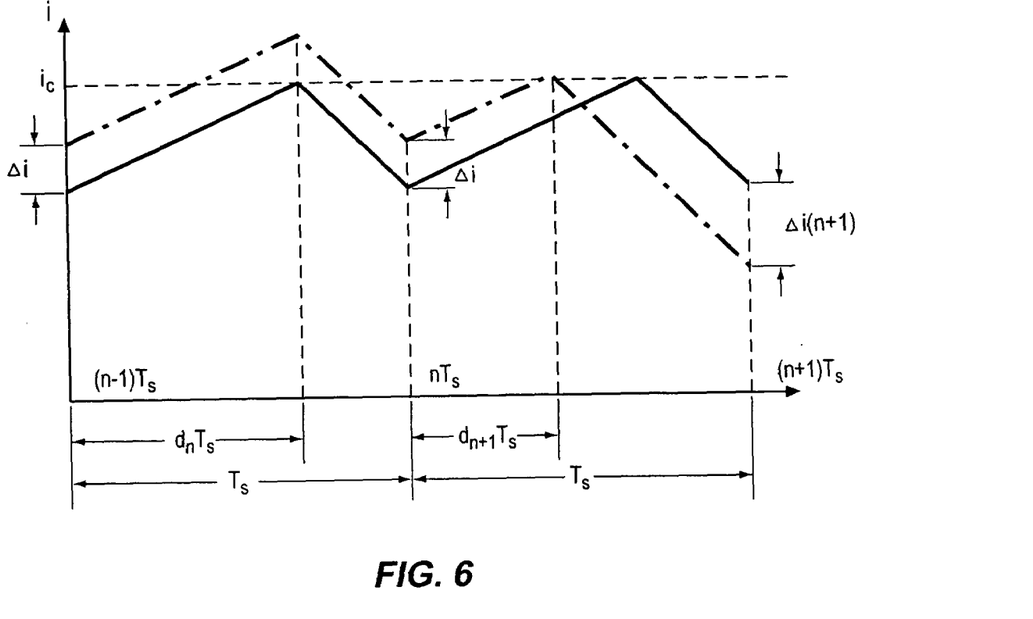
FIG. 6 is a graphical representation of instability of the inductor current using peak current control under trailing-edge pulse width modulation.

Predictive peak current control, which, among other advantages, features instantaneous peak current protection, is the most popular current programmed control method in analog implementations. In this section, we examine properties of the predictive peak current control under trailing-edge modulation. FIG. 6 illustrates the inductor current waveform where the solid line corresponds to the steady state operation, while the dashed line shows the current with a perturbation $\Delta i$ at the beginning of the switching period n. In this case, the control objective is that the peak current follows the reference current $i_c$. As shown in FIG. 6, the next duty ratio d[n+1] is computed so that the peak current in the $(n+1)^{th}$ cycle equals the reference current $i_c$.

For the boost converter in continuous conduction mode (CCM), the steady-state duty cycle D and the steady-state peak current $I_{peak}$ are given by:

$$D = 1 - \frac{v_{in}}{V}, \quad (6)$$

and $$I_{peak} = I_0 + \frac{v_{in}DT_s}{L}, \quad (7)$$

where $I_0$ is the steady-state valley current. As shown in FIG. 6, assume that the perturbation $\Delta i$ in the inductor current has been detected by sampling the inductor current in the switching period n. Again, this perturbation will propagate to the beginning of the $(n+1)^{th}$ switching period. Taking into account this perturbation, the new duty cycle can be predicted using the following relationship:

$$i_{peak}[n+1] = i_c = I_0 + \Delta i + \frac{v_{in}d[n+1]T_s}{L}. \quad (8)$$

Using Equations (6) and (7), the predicted duty cycle can be written as:

$$d[n+1] = D - \frac{\Delta i L}{v_{in}T_s}. \quad (9)$$

Applying this duty cycle, the current at the end of the $n^{th}$ switching cycle is:

$$\begin{aligned} i(n+1) &= I_0 + \Delta i + \frac{v_{in}T_s}{L} + \frac{Vd[n+1]T_s}{L} - \frac{VT_s}{L} \\ &= I_0 + \Delta i - \Delta i\frac{V}{v_{in}} \\ &= I_0 - \frac{D}{1-D}\Delta i \end{aligned} \quad (10)$$

Therefore, the current perturbation at the end of the $(n+1)^{th}$ period is given by:

$$\Delta i(n+1) = i(n+1) - I_0 = -\frac{D}{1-D}\Delta i. \quad (11)$$

Equation (11) shows that oscillations occur under the operating conditions when the duty cycle is greater than 0.5 when trailing-edge pulse width modulation is used to predict a duty cycle under peak current control as illustrated in FIG. 6. Unlike valley current control under trailing-edge modulation wherein the perturbation disappears, the perturbation $\Delta i$ in the inductor current i(t) is carried into the next $(n+1)^{th}$ switching cycle, resulting in an oscillatory condition. This is the same instability problem as in analog current programmed control, where the instability is usually suppressed by adding a ramp signal to the sensed current signal.

Leading-Edge Pulse Width Modulation

Figure 8A:
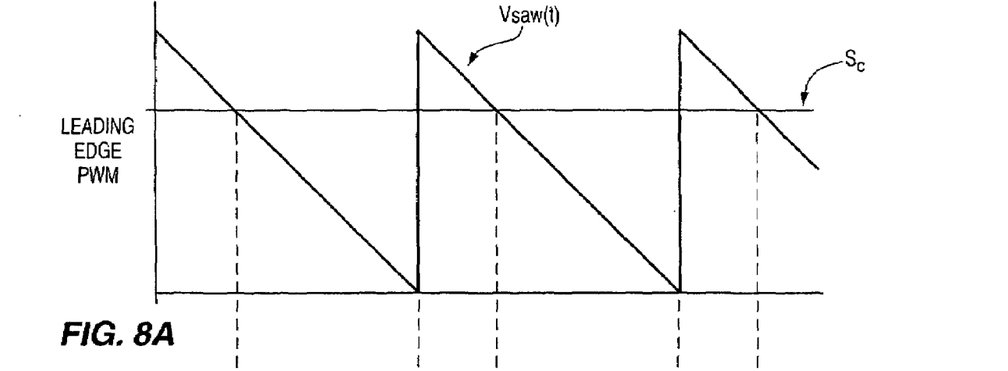
FIGS. 8a–8c illustrate a graphical representation of leading-edge pulse width modulation saw tooth waveform, a pulsating control signal, and a resultant inductor current under peak current control, respectively.
Figure 8B:
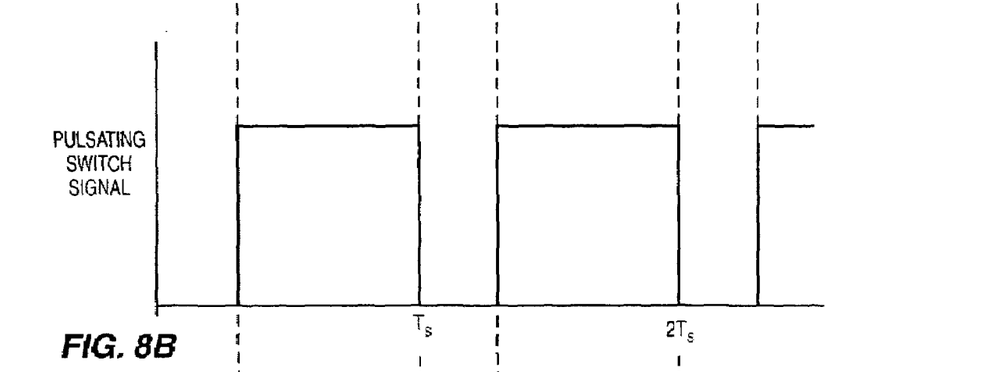
Figure 8C:
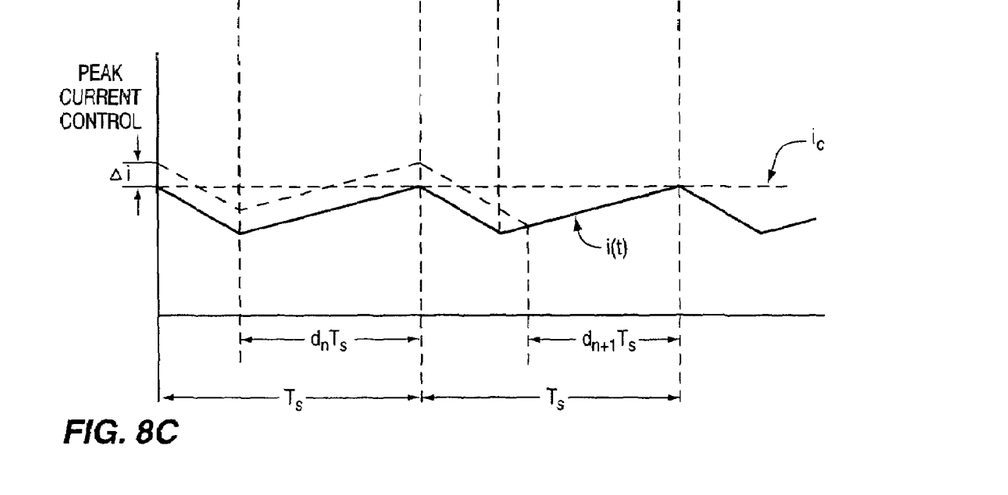

Peak current control under leading-edge modulation is illustrated by the waveforms of FIGS. 8a–8c. The pulsating switch control signal g(t) is generated by comparing the control variable $V_c$ with a leading-edge saw-tooth signal $V_{saw}(t)$. At the beginning of a switching period, the transistor switch is turned off, and then turned on at $(1-d)T_s$. The switch remains on until the end of the period. The peak current occurs at the beginning of each switching period, and therefore can be sampled at equally spaced intervals equal to $T_s$. Following the same steps as in valley current control under trailing-edge modulation, one finds that the predictive peak current control under leading-edge pulse width modulation follows the same law given by the basic control law of Equation (5) as the valley current control under trailing-edge modulation. The inductor current i(t) waveform of FIG. 8c illustrates the point that a perturbation disappears within a switching period; therefore, the predictive peak current control under leading-edge pulse width modulation is inherently stable.

Predictive Average Current Control

Trailing-Edge Modulation

In some applications, average current control is preferred compared to valley or peak current control. In particular, in PFC applications, average current control results in very low current distortion without the need for any additional compensation.

In predictive average current control, the new duty cycle is computed so that the average current <i[n+1]> in the next switching cycle equals the reference current $i_c$. The average current in the $(n+1)^{th}$ switching cycle can be written in terms of the valley current and the applied duty cycle:

$$\langle i[n+1] \rangle = i(n) + \frac{T_s v_{in}}{2L} - \frac{d'^2[n+1]T_s V}{2L}. \quad (12)$$

Figure 7:
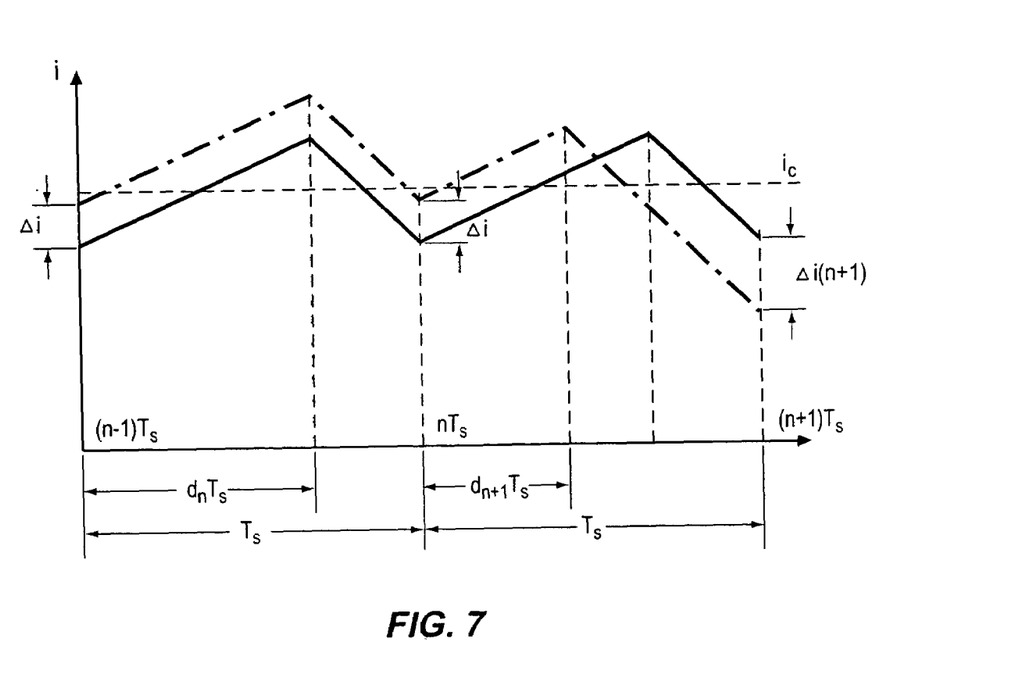
FIG. 7 is a graphical representation of instability of the inductor current using average current control under trailing-edge pulse width modulation.

Based on Equation (12), and assuming the steady-state and perturbed waveforms as shown in FIG. 7, the predicted duty cycle can be found from:

$$i_c = I_0 + \Delta i + \frac{T_s v_{in}}{2L} - \frac{d'^2[n+1]T_s V}{2L}. \quad (13)$$

In steady state, we have:

$$i_c = I_0 + \frac{T_s v_{in}}{2L} - \frac{D'^2 T_s V}{2L}. \quad (14)$$

Subtracting Equation (14) from Equation (13) yields:

$$\Delta i = (d'^2[n+1] - D'^2)\frac{T_s V}{2L}. \quad (15)$$

If we define $\Delta d = d'[n+1] - D'$, Equation (15) can be simplified as:

$$\Delta i = (\Delta d^2 + \Delta d \cdot 2D')\frac{T_s V}{2L}. \quad (16)$$

Neglecting the second order term, we obtain:

$$\Delta i \approx \Delta d \cdot 2D' \frac{T_s V}{2L}. \quad (17)$$

Using Equation (17), we can find the predicted duty cycle in terms of the perturbation and steady-state values:

$$d'[n+1] = D' + \frac{\Delta i L}{D' T_s V}. \quad (18)$$

The inductor current at the end of the $(n+1)^{th}$ switching cycle is then found as:

$$i(n+1) = I_0 + \Delta i - d'[n]\frac{VT_s}{L} \quad (19)$$

$$= I_0 - \frac{D}{1-D}\Delta i.$$

Finally, the perturbed current at the end of the $(n+1)^{th}$ period is given by:

$$\Delta i(n+1) = -\frac{D}{1-D}\Delta i. \quad (20)$$

Under trailing-edge modulation, the predictive average current control has the same instability problem under the operating conditions when the duty cycle is greater than 0.5 as illustrated in FIG. 7. Unlike valley current control under trailing-edge pulse width modulation wherein the perturbation disappears, the perturbation $\Delta i$ in the inductor current i(t) is carried into the next $(n+1)^{th}$ switching cycle, resulting in an oscillatory condition. This is the same instability problem as in peak current control under trailing-edge pulse width modulation.

Dual Edge (Triangle) Modulation

Figure 9A:
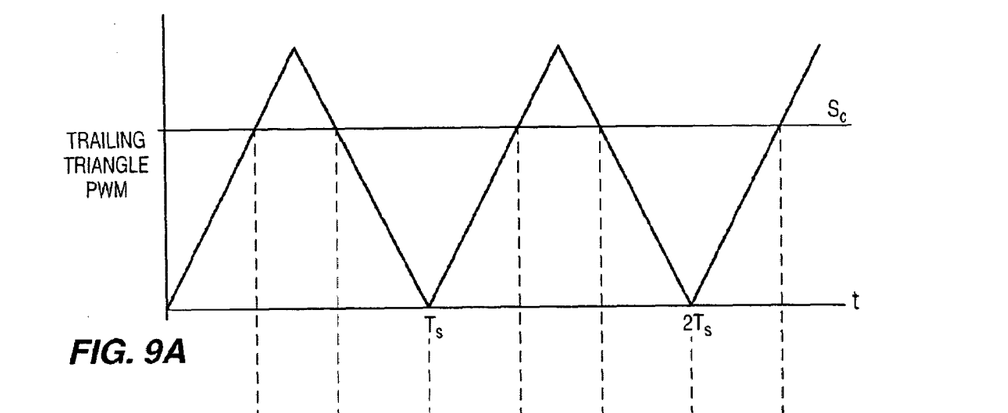
FIGS. 9a–9c illustrate a graphical representation of trailing triangular pulse width modulation waveform, a pulsating control signal, and a resultant inductor current under average current control, respectively.
Figure 9B:
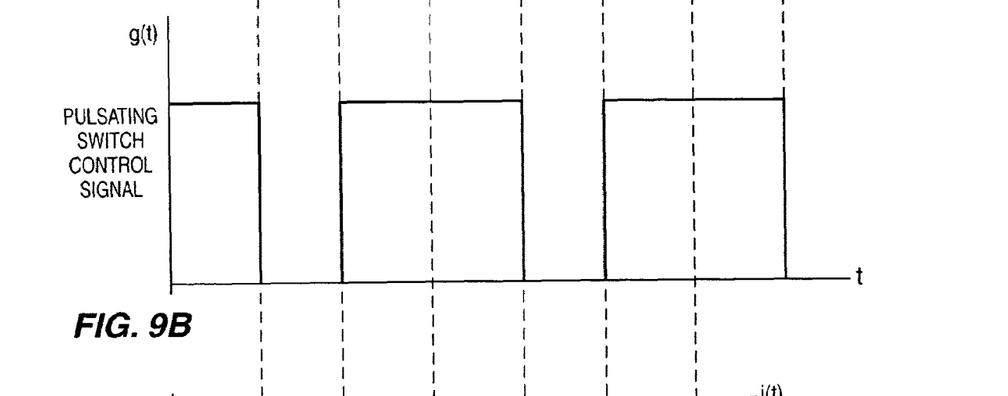

The dual edge, or triangle, pulse width modulation is found to be suitable for achieving predictive average current control without oscillation problems observed with trailing-edge pulse width modulation. Triangular pulse width modulation can be defined as trailing, illustrated by the waveforms of FIG. 9a, or as leading (not shown). In the case of the trailing triangle pulse width modulation, the transistor switch is on at the beginning of a switching cycle, it is turned off at $(d/2)T_s$, and then turned on again at $(1-d/2)T_s$. In the case of the leading triangle pulse width modulation, the transistor switch is off at the beginning of a switching cycle.

Figure 9C:
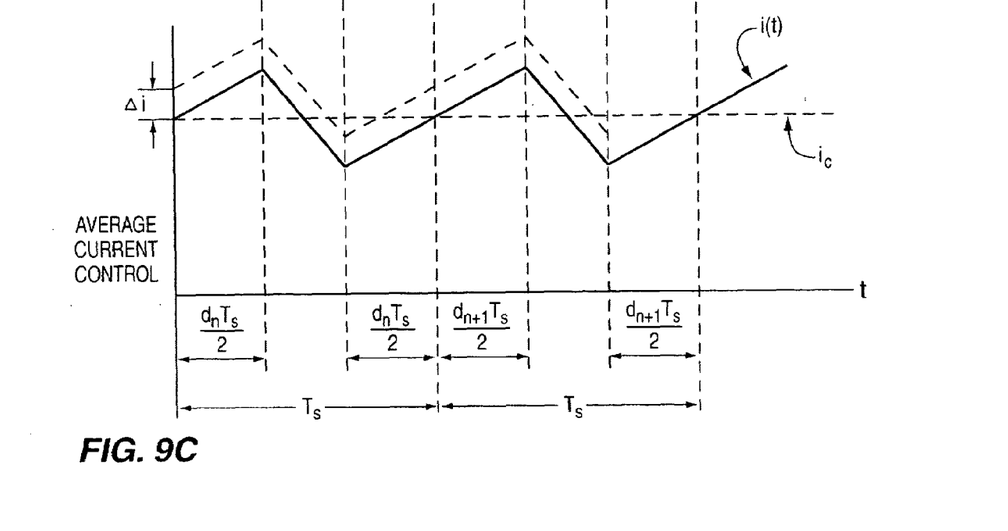
Figure 10:
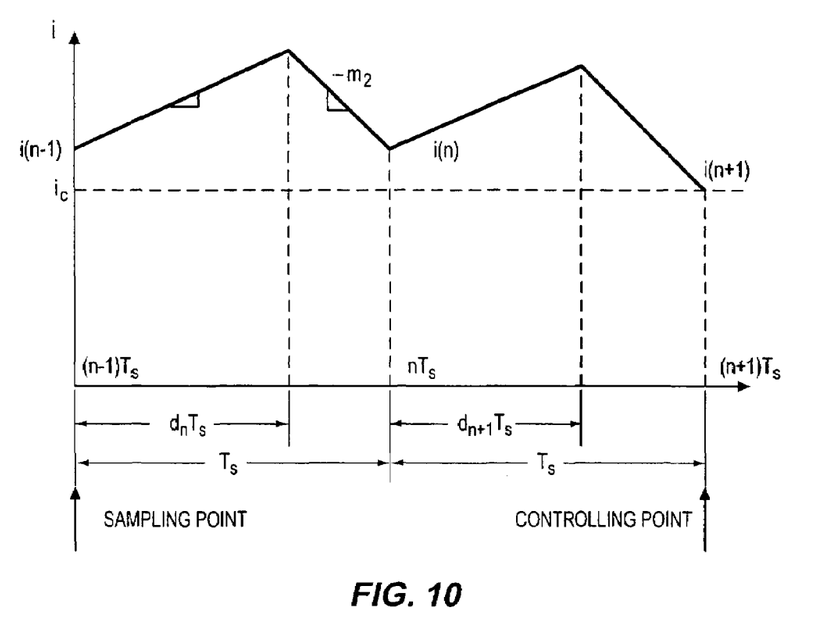
FIG. 10 is a graphical representation of a generic inductor waveform under valley current control.

Both triangle pulse width modulation methods are suitable for the predictive average current control. We again find that the same control law given by Equation (5) applies in this case. The inductor current waveform illustrating operation of the predictive average current control under trailing triangular pulse width modulation of FIG. 9c shows the point that perturbation (the dashed line) disappears within a switching period, illustrating that predictive average current control under triangular pulse width modulation is inherently stable.

Summary of Predictive Current Control and Modulation Methods

Figure 4:
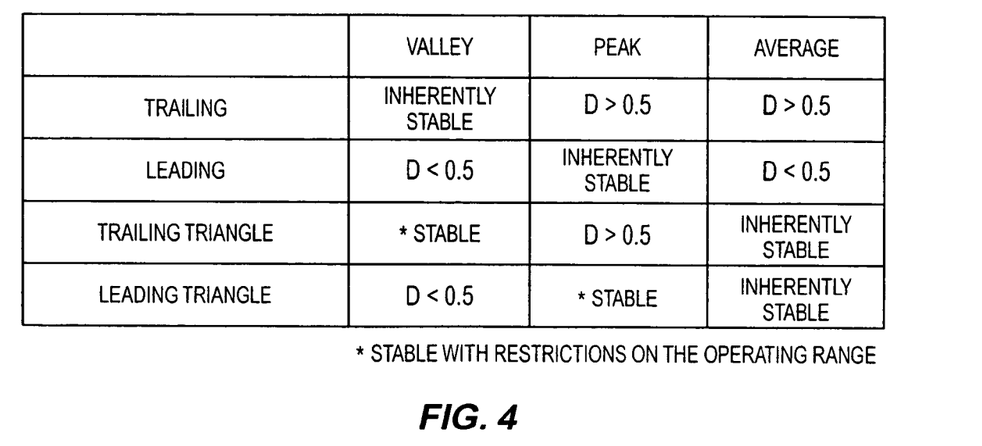
FIG. 4 is a table correlating current control objectives and pulse width modulation methods.

The table illustrated in FIG. 4 summarizes the correlation between different pulse width modulation methods and the current controlled variables of interest. It can be observed that, for each current control variable of interest (valley, peak, or average current), there is a choice of the appropriate pulse width modulation method to achieve predictive digital control without oscillation problems. Furthermore, the same predictive control law given by Equation (5) applies to: (1) valley current control under trailing-edge modulation; (2) peak current control under leading-edge modulation; and (3) average current control under triangle modulation.

Figure 11:
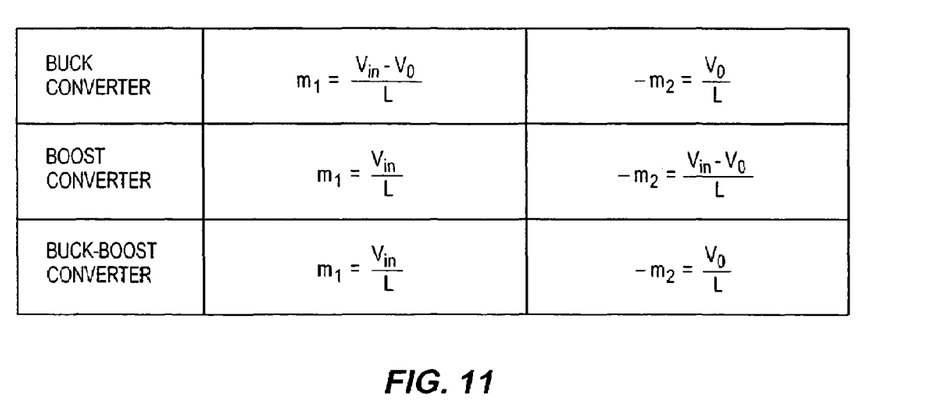
FIG. 11 illustrates a table of inductor current slope information for basic converters.
Figure 12:
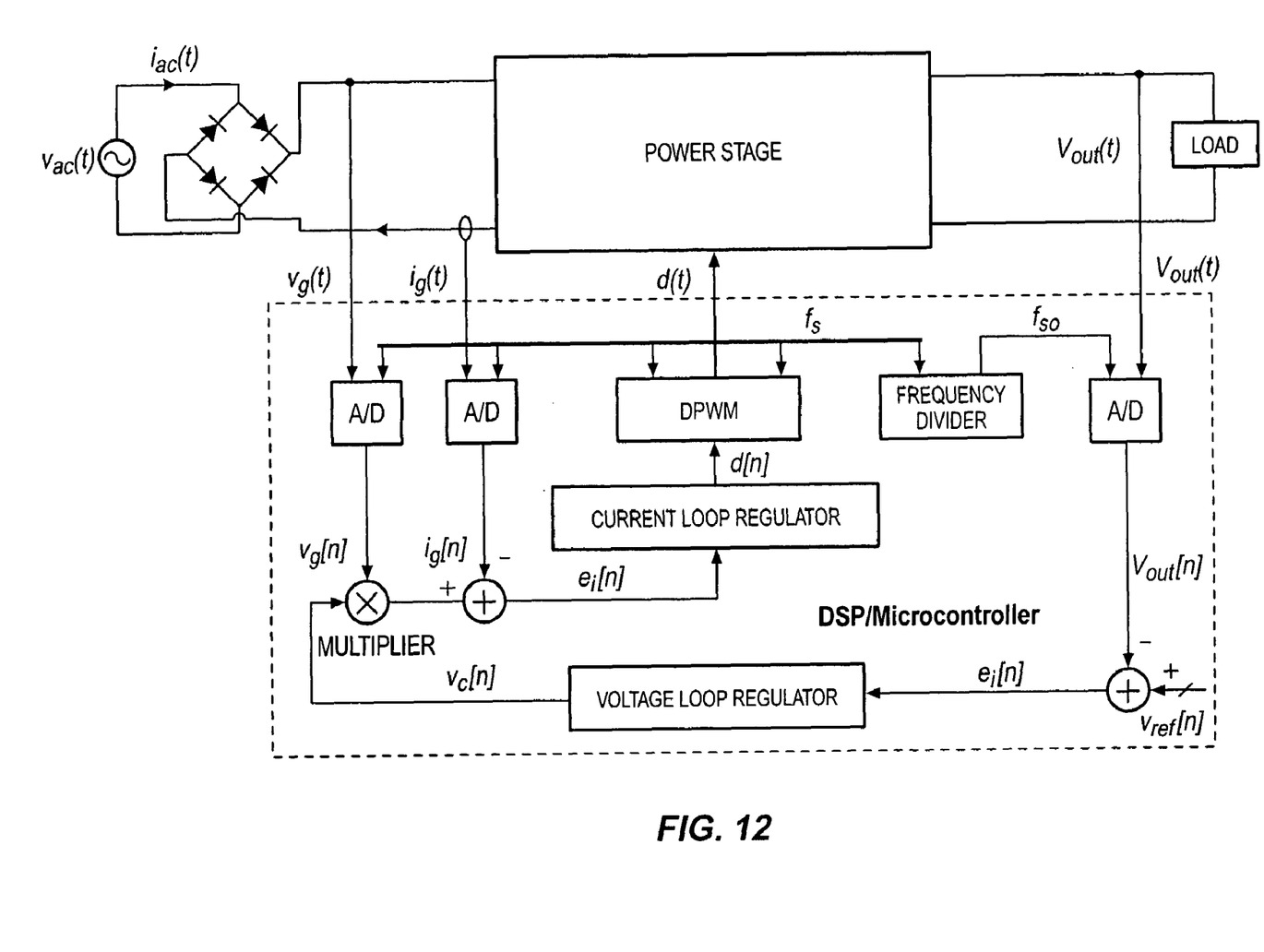
FIG. 12 illustrates a schematic diagram of an experimental digitally controlled converter employing an outer voltage and inner current loop.

Besides the boost converter, basic principles of predictive control can be extended to other basic converters, i.e., the buck converter and the buck-boost converter. FIG. 12 illustrates the generic continuous conduction mode inductor current waveform for switching converters under the trailing-edge modulation. In the transistor on subinterval, the inductor current increases with a slope m1, and a slope −m2 during the transistor off subinterval. For the basic nonisolated converters, the slopes are given in the table illustrated in FIG. 11.

The predictive control law can be expressed as a function of the slopes m1, m2, switching period, and previous duty ratio:

$$d[n+1] = -d[n] - \frac{1}{(m_1+m_2)T_s}[i_s[n] - i_c] + 2\frac{m_2}{m_1+m_2} \quad (21)$$

By plugging in expressions of m1 and m2, we obtain the predictive control law for the buck converter:

$$d[n+1] = -d[n] - \frac{L}{v_{in}T_s}[i_s[n] - i_c] + 2\frac{v_o}{v_{in}}, \quad (22)$$

and for the buck-boost converter:

$$d[n+1] = -d[n] - \frac{L}{(v_{in}+v_o)T_s}[i_s[n] - i_c] + 2\frac{v_o}{v_o+v_{in}} \quad (23)$$

The stability equation can be rewritten as:

$$\Delta i(n+1) = -\frac{M_1}{M_2}\Delta i \quad (24)$$

Equation (24) is a generic equation suitable for all basic converters to identify the oscillation condition.

In steady state, inductor volt-second balance has to be satisfied in a switching period for switching converters, so we can write:

$$DM_1 - (1-D)M_2 = 0, \quad (25)$$

or $$\frac{M_1}{M_2} = \frac{D}{1-D} \quad (26)$$

Equations (25) and (26) show that the stability condition under certain modulation methods is unique for all the nonisolated converters in continuous conduction mode. Moreover, the correlation between the modulation methods and current control objectives for the boost converter and the robustness condition on the inductance variation can be extended to all nonisolated converters.

Experimental Results

To demonstrate performance of the predictive current control, a 100 W single-phase experimental power-factor-correction (PFC) boost converter illustrated in the schematic diagram of FIG. 12 was designed and tested for avionics applications, which have more demanding specifications, including the line input frequency of 400 Hz–800 Hz, and low total harmonic distortion (THD)<10%. The predictive current control and output voltage regulation were realized using the Analog Devices ADMC-401 DSP, which has built-in digital PWM, A/D converters, and a 16-bit fixed-point computation unit. The input inductance was 1 mH, the output capacitance was 47 uF, and the output DC voltage was regulated at 190V.

The two-loop system as shown in FIG. 12 was implemented. The input current and the input voltage were sampled at the switching frequency (100 KHz or 200 KHz) to ensure the high performance of the current loop in which predictive average current control under triangle modulation was used. The output voltage loop uses a slow PI regulator that provides a bandwidth of about one-third of the line input frequency. The output voltage was sampled at a frequency of KHz, which was sufficient to implement functions of the slow output voltage loop while at the same time being relatively easy to realize using fixed-point arithmetic.

Figure 13:
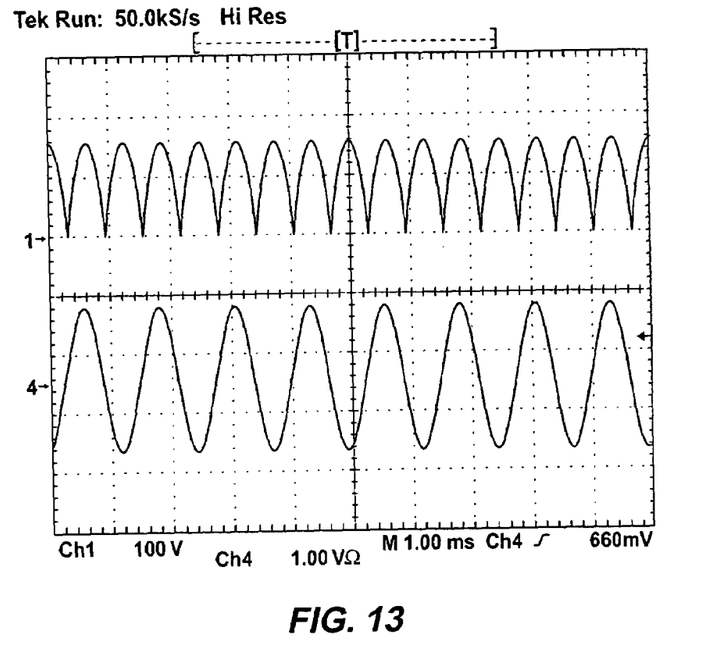
FIG. 13 is representative of an oscilloscope display of rectified input voltage (top, setting at 100 Volts/div), and the input current (bottom waveform, setting at 1 Amp/div.) at 200 KHz switching frequency, 800 Hz line frequency, and THD is 2.2%.
Figure 14:
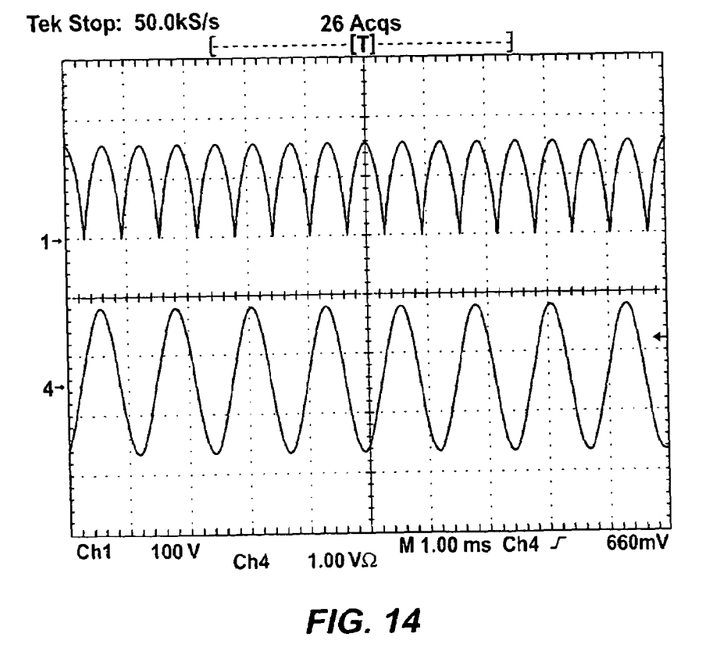
FIG. 14 is representative of an oscilloscope display of rectified input voltage (top, setting at 100 Volts/div), and the input current (bottom waveform, setting at 1 Amp/div.) at 100KHz switching frequency, 800 Hz line frequency, and THD is 2.4%.

FIGS. 13 and 14 show the rectified input voltage (115 Vrms) and input current waveforms at the switching frequency of 200 KHz and 100 KHz, respectively. This comparison shows that low-harmonics performance doesn't heavily rely on very high switching frequency. THD of less than 2.5% is achieved under all conditions, even when the input line frequency was 800 Hz, and the switching frequency was 100 KHz.

It was found that, for each variable of pulse width modulation (peak, average, and valley), there is a choice of the appropriate modulation method to achieve predictive digital control without oscillation problems. It is also shown that the predictive control law is the same for the control techniques where the oscillation problem is eliminated: (1) valley current control under trailing-edge modulation; (2) peak current control under leading-edge modulation; and (3) average current control under dual-edge (triangle) modulation. The proposed digital control techniques can be used in a range of power conversion applications, including rectifiers with power factor correction. A prototype of a 100 W PFC boost rectifier switching at 100 KHz or 200 KHz was constructed using a DSP system to implement the predictive average current control and a PI voltage loop control. Low THD (<2.5%) and high performance meeting rigorous avionics requirements (400 Hz–800 Hz line frequency) were experimentally demonstrated.

There has been described a novel predictive digital current controller for power switching supplies. It should be understood that the particular embodiments shown in the drawings and described within this specification are for purposes of example and should not be construed to limit the invention, which will be described in the claims below. Further, it is evident that those skilled in the art may now make numerous uses and modifications of the specific embodiments described, without departing from the inventive concepts. It is also evident that the methods recited may, in many instances, be performed in a different order; or equivalent structures and processes may be substituted for the various structures and processes described. Consequently, the invention is to be construed as embracing each and every novel feature and novel combination of features present in and/or possessed by the invention herein described.

What is claimed is:

1. A method for producing a stable output voltage for a switching power converter under predictive digital current control and using pulse width modulation, said method comprising:
   selecting one of peak current control and average current control as said predictive digital current control;
   selecting one of leading edge pulse width modulation or triangular pulse width modulation as said pulse width modulation; and
   controlling said switching power converter according to said selected current control and said selected pulse width modulation to produce said stable output voltage.

2. The method of claim 1 wherein said current control is a peak current control.

3. The method of claim 2 wherein said pulse width modulation method is a leading-edge pulse width modulation.

4. The method of claim 1 wherein said current control is an average current control.

5. The method of claim 4 wherein said pulse width modulation method is a triangular pulse width modulation.

6. The method of claim 1 wherein:
   said predictive current control comprises: sampling an input reference current at the beginning of each next switching cycle; and
   predicting a next duty cycle of a pulsating control signal to generate a next duty cycle control signal; and
   said pulse width modulation comprises applying said next diary cycle control signal to a pulse width modulation signal corresponding to said selected pulse width modulation method to generate said pulsating control signal to produce said controlled output voltage for said switching power converter.

7. The method of claim 6 wherein said pulse width modulation is analog pulse width modulation, the method further comprising converting said next duty cycle control signal to an analog control signal for use by said analog pulse width modulator.

8. A method for producing a continued output voltage for a switching power converter under predictive digital current control and using pulse width modulation, said method comprising:
   selecting one of a peak current control and an average current control as said predictive digital current control that results in an unstable output voltage;
   selecting one of a leading-edge pulse width modulation and a triangular pulse width modulation as said pulse width modulation; and
   controlling said switching power converter according to said selected current control and said selected pulse width modulation to eliminate said instability in said output voltage.

9. The method of claim 8 wherein said current control is said peak current control.

10. The method of claim 9 wherein said pulse width modulation for eliminating said instability is said leading-edge pulse width modulation.

11. The method of claim 8 wherein said current control method is said average current control.

12. The method of claim 11 wherein said pulse width modulation for eliminating said instability is said triangular pulse width modulation.

13. A method for producing a controlled output voltage for a switching power converter under predictive digital current control and using pulse width modulation, said method comprising:
   selecting one of a peak current control and an inherently unstable average current control as said predictive digital current control resulting in an unstable output voltage;
   selecting one of a leading-edge pulse width modulation and a triangular pulse width modulation as said pulse width modulation to eliminate said instability in said output voltage; wherein
   said predictive digital current control comprises: sampling an input current at the beginning of each next switching cycle; and
   predicting a next duty cycle of a pulsating control signal to generate a next duty cycle control signal; and
   said pulse modulation comprises applying said next duty cycle control signal to a pulse width modulation signal corresponding to said selected one of said leading-edge pulse width modulation and said triangular pulse width modulation to generate said pulsating control signal.

14. The method of claim 13 wherein said current control is a peak current control and said pulse width modulation method is a leading-edge pulse width modulation.

15. The method of claim 13 wherein said current control is an average current control and said pulse width modulation is a triangular pulse width modulation.

16. A switching power converter for controlling an output voltage under current control using pulse width modulation comprising:
   a predictive digital current-mode controller under one of a peak current control and an average current control for predicting a next duty cycle of a pulsating control signal and generating a control signal in said switching power converter; and
   a pulse width modulator for producing said pulsating control signal by applying said control signal to one of a leading-edge pulse width modulation and a triangular pulse width modulation to produce a stable output voltage from said switching power converter.

17. The switching power converter of claim 16 wherein said predictive digital current-mode controller is a predictive digital peak current controller.

18. The switching power converter of claim 17 wherein said pulse width modulator uses a leading-edge pulse width modulation to produce said stable output voltage.

19. The switching power converter of claim 16 wherein said predictive digital current-mode controller is a predictive digital average current controller.

20. The switching power converter of claim 19 wherein said pulse width modulator uses a triangular pulse width modulation to produce said stable output voltage.

* * * * *